(12) United States Patent
Lin

(10) Patent No.: US 11,201,546 B2
(45) Date of Patent: Dec. 14, 2021

(54) POWER CONVERTER AND CONTROL CIRCUIT THEREOF

(71) Applicant: FSP TECHNOLOGY INC., Taoyuan (TW)

(72) Inventor: Kuo-Fan Lin, Taoyuan (TW)

(73) Assignee: FSP TECHNOLOGY INC., Taoyuan (TW)

( * ) Notice: Subject to any disclaimer, the term of this patent is extended or adjusted under 35 U.S.C. 154(b) by 49 days.

(21) Appl. No.: 16/857,169

(22) Filed: Apr. 23, 2020

(65) Prior Publication Data

US 2020/0343818 A1 Oct. 29, 2020

Related U.S. Application Data

(60) Provisional application No. 62/838,949, filed on Apr. 26, 2019.

(51) Int. Cl.
*H02M 3/335* (2006.01)
*H02M 1/34* (2007.01)
*H02M 1/00* (2006.01)

(52) U.S. Cl.
CPC ....... *H02M 3/33507* (2013.01); *H02M 1/342* (2021.05); *H02M 1/0032* (2021.05); *H02M 1/0058* (2021.05); *H02M 3/33523* (2013.01)

(58) Field of Classification Search
CPC ......... H02M 1/34–348; H02M 1/0025; H02M 1/0032; H02M 1/0058; H02M 3/335–33592
See application file for complete search history.

(56) References Cited

U.S. PATENT DOCUMENTS

| 5,805,434 A * | 9/1998 | Vinciarelli | H02M 3/33507 363/16 |
| 6,496,392 B2 * | 12/2002 | Odell | H02M 1/34 363/56.11 |
| 7,869,235 B2 * | 1/2011 | Lin | H02M 1/34 363/56.11 |
| 2005/0285661 A1 * | 12/2005 | Wittenbreder | H02M 1/08 327/434 |
| 2012/0212981 A1 * | 8/2012 | Lin | H02M 3/33507 363/21.15 |

(Continued)

FOREIGN PATENT DOCUMENTS

WO    WO-2010143124 A1 * 12/2010 ............. H02M 1/34

*Primary Examiner* — Fred E Finch, III
(74) *Attorney, Agent, or Firm* — Winston Hsu

(57) ABSTRACT

A power converter including: an output unit outputs a converted voltage; a transformer includes a first primary wiring, second primary wiring, and a secondary wiring; a first switch unit is coupled between first primary wiring and a second node; a delay unit is coupled to a control terminal of first switch unit; a first control unit generates a first control signal according to the converted voltage to control ON/OFF state of the first switch unit via the delay unit; the processing unit, coupled between the input voltage and the first node, receives, stores induced power of first induced voltage and releases the stored energy; and the second control unit generates a second control signal to control ON/OFF state of a second switch unit of processing unit to control receiving or releasing the energy according to the input voltage and induced power of first primary wiring.

16 Claims, 8 Drawing Sheets

(56) References Cited

U.S. PATENT DOCUMENTS

| | | | |
|---|---|---|---|
| 2015/0381031 A1* | 12/2015 | Ghosh | H02M 3/33507 363/21.12 |
| 2018/0183346 A1* | 6/2018 | Strijker | H02M 1/34 |
| 2018/0358902 A1* | 12/2018 | Duvnjak | H02M 3/33507 |
| 2019/0020268 A1* | 1/2019 | Saito | G06K 15/406 |

* cited by examiner

US 11,201,546 B2

POWER CONVERTER AND CONTROL CIRCUIT THEREOF

CROSS REFERENCE TO RELATED APPLICATIONS

This application claims the priority of U.S. provisional application Ser. No. 62/838,949, filed 2019 Apr. 26, which is entirely incorporated herein by reference.

BACKGROUND OF THE INVENTION

1. Field of the Invention

The present invention relates to a power converter circuit structure, and more particularly to a power converter and its control circuit and method which can operate both in continuous and discontinuous conduction modes and achieve zero voltage switching.

2. Description of the Prior Art

Generally speaking, a traditional power converter such as an actively clamped flyback power converter may use an active clamping circuit to absorb the leakage inductance energy of the transformer when the main switch of the flyback power converter is turned off, to reduce the voltage spike occurring at the main switch. However, the traditional flyback power converter still has the problems of excessive circulating current and phase shift of the secondary side current of the active clamping circuit. The excessive circulating current will cause more conduction losses and the phase shift of the secondary side current will cause a higher spike voltage occur at the switching element of the secondary side, to result in more switching losses. The overall efficiency of such traditional converter is poor, and cannot achieve the improved conversion efficiency.

SUMMARY OF THE INVENTION

Therefore one of the objectives of the present invention is to provide a power converter and control circuit and method that can operate in continuous or discontinuous conduction mode and realize zero voltage switching, so as to solve the problems encountered in the traditional power converter.

According to embodiments of the invention, a power converter is disclosed. The power converter comprises an output circuit, a first transformer, a first switch unit, a delay unit, a first control unit, a processing unit, and a second control unit. The output unit is used for outputting a converted voltage. The first transformer comprises a first primary winding, a second primary winding, and a secondary winding wherein the first primary winding is coupled to an input voltage and a first node, the second primary winding is coupled to a second node, and the secondary winding is coupled to the output unit and the second node. The first switch unit is coupled between the first primary winding and the second node, and is used for controlling magnetic flux direction of the first primary winding. The delay unit is coupled to a control node of the first switch unit. The first control unit is coupled to the converted voltage and coupled to the first switch unit via the delay unit, and is used for generating a first control signal according to the converted voltage to control ON/OFF of the first switch unit via the delay unit. The processing unit is coupled between the input voltage and the first node, and the processing unit is used for receiving a first induced voltage of the first node and storing induced power of the first induced voltage through a first path and isolating the first induced voltage from feeding in through a second path different from the first path simultaneously when the first switch unit is in an OFF state, and used for releasing the stored induced power through the second path. The second control unit is coupled to the input voltage, the first control unit, the processing unit, and the first primary winding, and is used for generating a second control signal according to the input voltage and induced power of the first primary winding, to control ON/OFF of a second switch unit of the processing circuit so as to control receiving or releasing the stored induced power.

According to the embodiments, a power converter is disclosed. The power converter comprises an output circuit, a first transformer, a first switch unit, a delay unit, a first control unit, a processing unit, and a second control unit. The output unit is used for outputting a converted voltage. The first transformer comprises a first primary winding, a second primary winding, and a secondary winding wherein the first primary winding is coupled to an input voltage and a first node, the second primary winding is coupled to a second node, and the secondary winding is coupled to the output unit and the second node. The first switch unit is coupled between the first primary winding and the second node, and is used for controlling magnetic flux direction of the first primary winding. The delay unit is coupled to a control terminal of the first switch unit. The first control unit is coupled to the converted voltage and coupled to the first switch unit via the delay unit, and is used for generating a first control signal according to the converted voltage to control ON/OFF of the first switch unit through the delay unit. The processing unit is coupled between the input voltage and the first node, and the processing unit is used for receiving a first induced voltage of the first node and storing induced power of the first induced voltage through a first path and isolating the first induced voltage from feeding in through a second path different from the first path simultaneously when the first switch unit is in an OFF state, and used for releasing the stored induced power through the second path. The second control unit is coupled to the first control unit, the processing unit, and the first primary winding, and is used for generating a second control signal according to induced power of the second primary winding, to control ON/OFF of a second switch unit of the processing unit to control receiving or releasing the stored induced power.

According to the embodiments, a control circuit of a power converter is disclosed. The power converter comprises an output circuit, a first transformer, a first switch unit, a first control unit, and a processing unit. The output unit is used for outputting a converted voltage. The first transformer comprises a first primary winding, a second primary winding, and a secondary winding wherein the first primary winding is coupled to an input voltage and a first node, the second primary winding is coupled to a second node, and the secondary winding is coupled to the output unit and the second node. The first switch unit is coupled between the first primary winding and the second node, and is used for magnetic flux direction of the first primary winding. The first control unit is coupled to the converted voltage and coupled to the first switch unit via a delay unit, and is used for generating a first control signal according to the converted voltage to control ON/OFF of the first switch unit through the delay unit. The processing unit is coupled between the input voltage and the first node, and the processing unit is arranged for receiving a first induced voltage of the first node and storing induced power of the first induced voltage through a first path and isolating the first induced voltage from feeding in through a second path different from the first path simultaneously when the first switch unit is in an OFF state, and used for releasing the stored induced power through the second path. The control circuit comprises a delay unit and a second control unit. The delay unit is coupled to a control terminal of the first switch unit, and is used for making the first control signal control ON/OFF of the first switch unit by using a delay of the delay unit. The second control unit is coupled to the input voltage, the first control unit, the processing unit, and the first primary winding, and is used for generating a second control signal according to the input voltage and induced power of the first primary winding, to control ON/OFF of a second switch unit of the processing unit to control receiving the induced power or releasing the stored induced power.

According to the embodiments, a control circuit of a power converter is disclosed. The power converter comprises an output circuit, a first transformer, a first switch unit, and a processing unit. The output unit is used for outputting a converted voltage. The first transformer comprises a first primary winding, a second primary winding, and a secondary winding wherein the first primary winding is coupled to an input voltage and a first node, the second primary winding is coupled to a second node, and the secondary winding is coupled to the output unit and the second node. The first switch unit is coupled between the first primary winding and the second node, and is used for controlling magnetic flux direction of the first primary winding. The processing unit is coupled between the input voltage and the first node, and the processing unit is arranged for receiving a first induced voltage of the first node and storing induced power of the first induced voltage through a first path and isolating the first induced voltage from feeding in through a second path different from the first path simultaneously when the first switch unit is in an OFF state, and used for releasing the stored induced power through the second path. The control circuit comprises a delay unit, a first control unit, and a second control unit. The delay unit is coupled to a control terminal of the first switch unit. The first control unit is coupled to the converted voltage and coupled to the first switch unit via the delay unit, and is used for generating a first control signal according to the converted voltage, to control ON/OFF of the first switch unit through the delay unit. The second control unit is coupled to the first control unit, the processing unit, and the first primary winding, and is used for generating a second control signal according induced power of the second primary winding to control ON/OFF of a second switch unit of the processing unit to control receiving the induced power of the first induced voltage or releasing the stored induced power of the first induced voltage.

The technical solution of the power converter disclosed in the present invention can overcome the limitations and problems that the traditional power converter circuit is merely designed in the application range of the low-power power supply circuit, and the operations can comprise the continuous conduction mode and the discontinuous conduction mode. When operating under a light load condition, the disclosed power converter can suppress spike voltage, achieve the recovery of leakage inductance energy, and perform the valley voltage switching. Also, when operating under a heavy load condition, the disclosed power converter can suppress spike voltage, achieve the recovery of leakage inductance energy, and perform the zero voltage switching. This can greatly improve the conversion efficiency of the disclosed power converter such as a flyback converter.

These and other objectives of the present invention will no doubt become obvious to those of ordinary skill in the art after reading the following detailed description of the preferred embodiment that is illustrated in the various figures and drawings.

DETAILED DESCRIPTION

The present invention aims at providing a power converter with a frequency modulation and a partial voltage clamping capability, e.g. a flyback converter. The power converter for example can operate under a discontinuous current/conduction mode (DCM) for light loads and also can operate under a continuous current/conduction mode (CCM) for heavy loads and can achieve the effect of zero voltage switching (ZVS).

Figure 1:
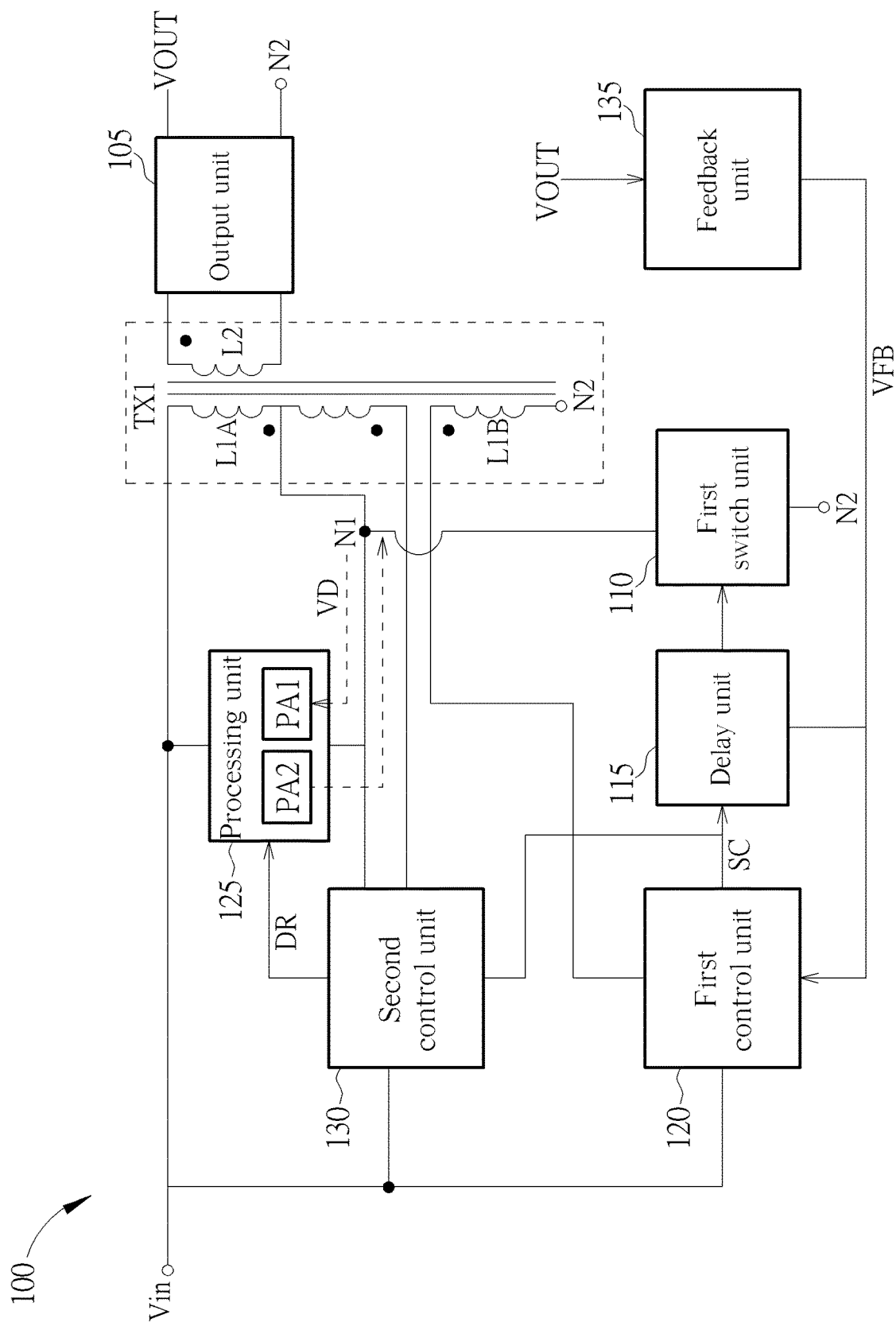
FIG. 1 is a functional block diagram of a generalized power converter according to an embodiment of the present invention.

Please refer to FIG. 1. FIG. 1 is a functional block diagram of a generalized power converter 100 according to an embodiment of the present invention. The power converter 100 such as a flyback converter includes an output unit 105, a first transformer TX1, a first switch unit 110 as a main switch, a delay unit 115, a first control unit 120, a processing unit 125, a second control unit 130 and a feedback unit 135. The first transformer TX1 includes a first primary winding L1A, a second primary winding L1B and a secondary winding L2. The first primary winding L1A is coupled to an input voltage Vin and a first node N1 (e.g. a terminal corresponding to the center point of the first primary winding L1A; but not limited). The second primary winding L1B is coupled to the second node such as the ground level (but not limited). The secondary winding L2 is coupled to the output unit 105. The polar directions of the three coils are shown in FIG. 1.

The first switch unit 110 is coupled between the first node N1 and the second node N2 and is used to control the magnetic flux direction of the first primary winding L1A. Through the switching of the first switch unit 110, the input voltage Vin can be correspondingly converted by the first transformer TX1 to output the converted voltage VOUT at the output unit 105. When the first switch unit 110 is switched from an ON state to an OFF state, a first induced voltage VD will be generated at the first node N1 correspondingly. The processing unit 125 such as an active clamping circuit is coupled between the input voltage Vin and the first node N1 and is used to receive the first induced voltage VD at the first node N1 and to storage the induced power of the first induced voltage VD via first path PA1 (located in the processing unit 125) when first switch unit 110 is in the OFF state. Simultaneously, the processing unit 125 is used to isolate the first induced voltage VD from feeding into the second path PA2 (located in the processing unit 125) that is different from the first path PA1. Then the processing unit 125 is used to release the stored induced power through the second path PA2. In addition, the induced power mentioned above is generated from the leakage inductance energy of the internal coil of the first transformer TX1 and can generate a voltage spike at the first node N1. The detail description of the circuits of the processing unit 125 is described later. It is noted that, in the case where the processing unit 125 can quickly receive the first induced voltage VD on the first path PA1 and store the induced power. The first induced voltage VD can be continuously isolated from the second path PA2, since the current flowing through the primary circuit of the first transformer TX1 is approximately zero before the induced power is released. As a result, the energy loss of power converter 300 is greatly reduced. In one embodiment, once the first switch unit 110 is switched from the ON state to the OFF state, the processing unit 125 immediately stores the induced power. After the processing unit 125 releases the induced power, the processing unit 125 is turned off early before the first switch unit 110 is switched from the OFF state to the ON state. This can achieve the effect of zero voltage switching during heavy load. In short, the sum of the period length for the processing unit 125 to receive the first induced voltage VD and store the induced power and the period length for the processing unit 125 to release the induced power is shorter than that in which the first switch unit 110 is at the OFF state. During the heavy load condition, when the first switch unit 110 is about to switch from the OFF state to the ON state, the voltage difference between the first node N1 and the second node N2 is approximately zero. The period for the processing unit 125 to release the induced power is not overlapped with the period during which the first switch unit 110 is at the ON state. Then length of the period during which the processing unit 125 uses the second path PA2 to release the stored induced power and corresponding timings are determined by the second control unit 130; the corresponding description is described later.

The delay unit 115 is coupled to the control terminal of the first switch unit 110, and is used to delay a first control signal SC which is generated by the first control unit 120 and transmitted to the control terminal of the first switch unit 110, so that the start time of turning on the first switch unit 110 can be later than the end time of the operation of the processing unit 125 to release the induced power for at least a delay time. Therefore, the turn-on period of the first switch unit 110 can be separated from the period during which the processing unit 125 releases the induced power.

The first control unit 120 is coupled to the input voltage Vin, the second control unit 130, the feedback unit 135, the second primary winding L1B, the first switch unit 110 via the delay unit 115, and coupled to the converted voltage VOUT via the feedback unit 135. The first control unit 120 generates the first control signal SC according to the converted voltage VOUT (or the feedback voltage VFB corresponding to the converted voltage VOUT) to control ON/OFF of the first switch unit 110 via the delay unit 115.

The second control unit 130 is coupled to the input voltage Vin, the first control unit 120, the processing unit 125, and the primary winding (L1A and L1B). The second control unit 130 generates a second control signal DR to the second switch unit, located on the second path PA2, of the processing unit 125 according to the induced power of the second primary winding L1B, to control ON/OFF state of the second switch unit of the processing unit 125 to control the length and time points of releasing the stored induced power. It should be noted that the second control unit 130 adopts the principle of volts-second balance to convert the alternating-current (AC) voltage at the transformer into a current to charge or discharge a specific capacitor to generate a triangular wave signal. Then the second control unit 130 uses a pair of comparators to respectively compare the voltage of the triangular wave signal with the voltage induced by the first primary winding L1A and compare the voltage of the triangular wave signal with an equivalent zero volt so as to respectively determine the start time and end time of releasing the stored induced power, i.e. to determine the turn-on period of the second switch unit on the second path PA2 in the processing unit 125. This can make the turn-on period of the second switch unit on the second path PA2 in the processing unit 125 become shorter and less lost energy, and also effectively improves the conversion efficiency.

Figure 2:
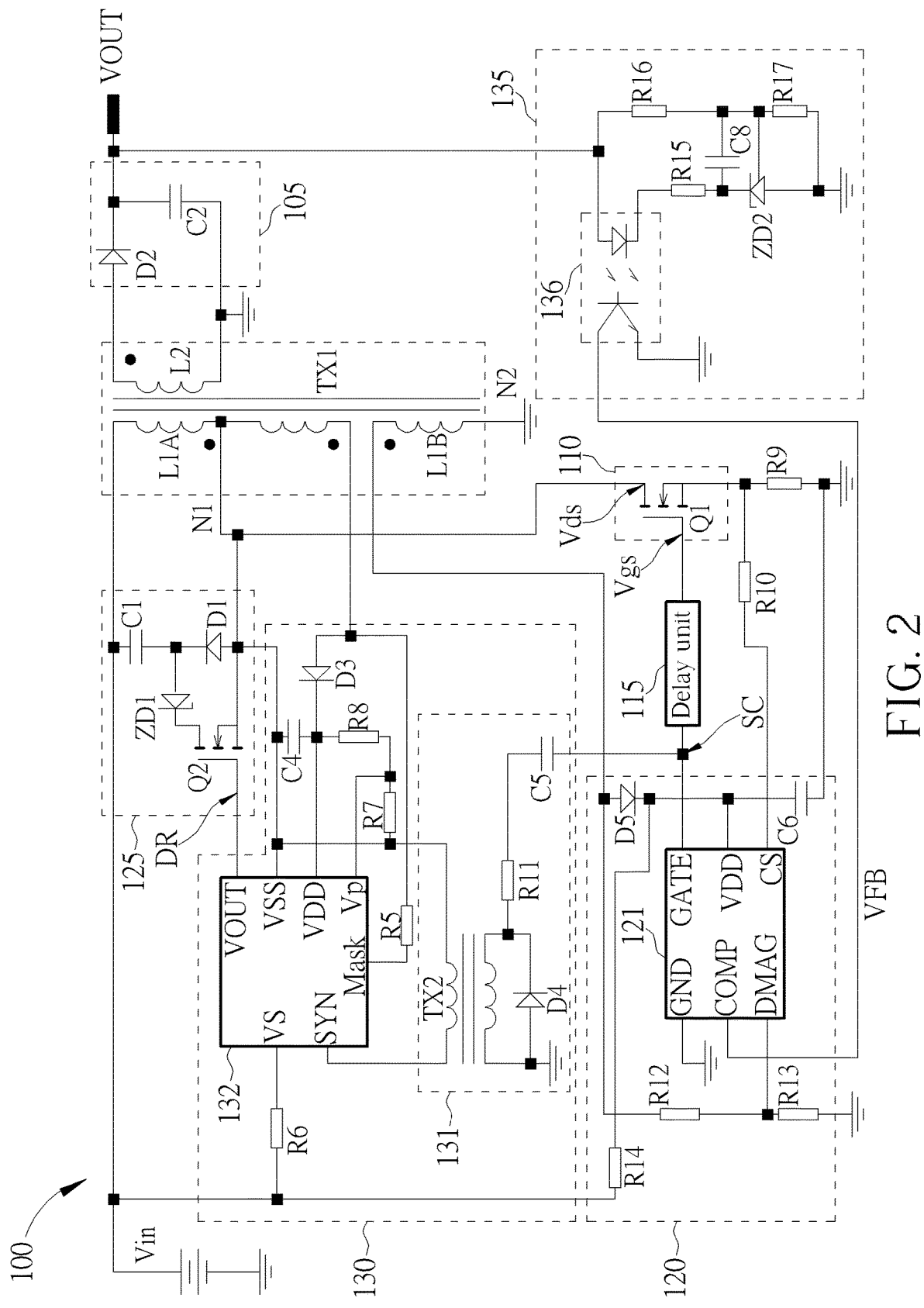
FIG. 2 is a detailed circuit diagram of an implementation example of the power converter shown in FIG. 1.

Please refer to FIG. 2. FIG. 2 is a detailed circuit diagram of an implementation example of the power converter 100 shown in FIG. 1. As shown in FIG. 2, the output unit 105 includes a diode D2 and a capacitor C2. The second node N2 is a ground level such as an equivalent zero volts. The feedback unit 135 includes a resistor R15, a resistor R16, a resistor R17, a capacitor C8, a Zener diode ZD2, and a photo-coupler unit 136. The processing unit 125 includes a capacitor C1 as a clamping capacitor, a diode D1 as a clamping diode, a Zener diode ZD1, and the second switch unit such as a transistor Q2 (used as a clamping switch). The first switch unit 110 includes a transistor Q1, and the control terminal of the transistor Q1, such as the gate, connected to the delay unit 115. The source terminal of the transistor Q1 is connected to the second node N2 (such as a ground level) through the resistor R9, and its drain terminal is connected to the first node N1. The first control unit 120 includes the resistor R12, resistor R13, resistor R14, pulse width modulation (PWM) controller 121, diode D5 and the capacitor C6. The function and operation of the first control unit 120 is mainly realized by the PWM controller 121. The PWM controller 121 for example has the nodes GND, COMP, DMAG, GATE, VDD, and CS, etc. For example, the nodes are implemented by the ports/pins (but not limited). That is, the PWM controller 121 may be a single integrated circuit; alternatively, the PWM controller 121 may be integrated with other components in the first control unit 120 into an integrated circuit. The node GND is coupled to the ground level. The node COMP is coupled to the photo-coupler unit 136 of the feedback unit 135. The node DMAG is coupled between the resistor R12 and the resistor R13. The resistor R10 is coupled between the node CS and a terminal of the resistor R9. The node VDD is coupled between the capacitor C6 and the resistor R14. The node GATE is coupled to the delay unit 115 to generate the first control signal SC to the delay unit 115.

The second control unit 130 includes a synchronization circuit 131 (for example consisting of second transformer TX2, capacitor C5, resistor R11, diode D4), resistor R5, resistor R6, resistor R7, resistor R8, diode D3, and a partial pulse generating circuit 132. The partial pulse generating circuit 132 has nodes VS, VSS, SYN, Mask, VDD, Vp, and VOUT. For example the nodes are implemented by using ports or pins (but not limited). That is, the partial pulse generating circuit 132 may be a single integrated circuit; alternatively, the partial pulse generating circuit 132 may be integrated with other components in the second control unit 130 to form a single integrated circuit; alternatively, the partial pulse generating circuit 132 may be integrated with other component (s) outside the second control unit 130, e.g. the processing unit 125 and/or the delay unit 115 to form a single integrated circuit as a control circuit. The second control signal DR is generated from the node VOUT to the processing unit 125 to control the transistor Q2. The node VS is coupled to the input voltage Vin through the resistor R6. The node VSS is coupled to the first node N1. The node SYN is connected to one side of the second transformer TX2. The node Mask is coupled to the induced voltage or energy of the first primary winding L1A via the resistor R5. The node Vp is coupled to the induced voltage or energy of the first primary winding L1A via the resistor R7, resistor R8 and the diode D3. The node VDD is coupled to the induced voltage or energy of the first primary winding L1A through the diode D3. In addition, the two ends of the capacitor C4 are coupled between the node VDD and the node VSS. In practice, the implementation of the partial pulse generating circuit 132 for example is shown on FIG. 3.

Figure 3:
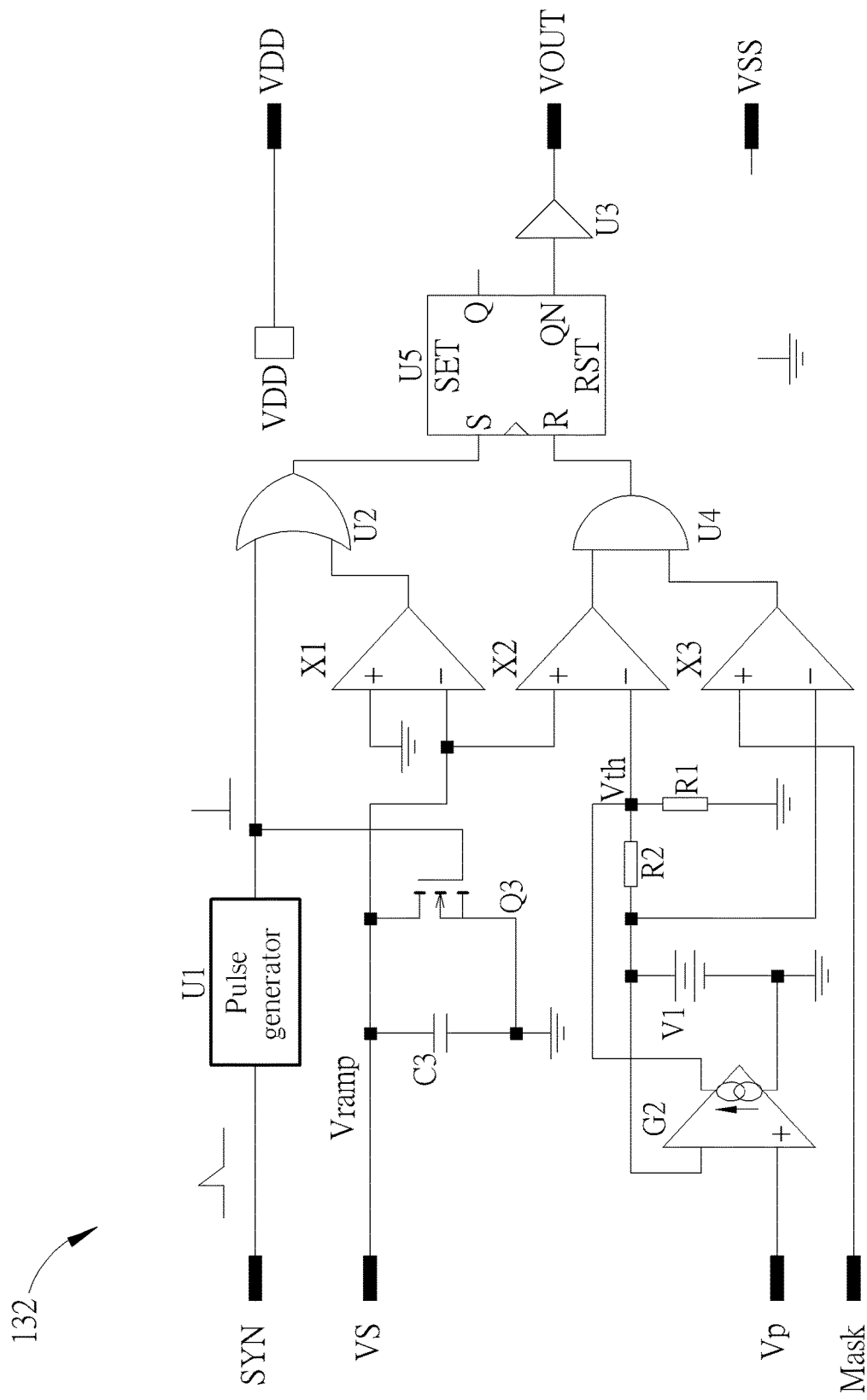
FIG. 3 is a schematic diagram of an embodiment of the partial pulse generating circuit shown in FIG. 2.

FIG. 3 is a schematic diagram of an embodiment of the partial pulse generating circuit 132 shown in FIG. 2. As shown in FIG. 3, the partial pulse generating circuit 132 includes a pulse generator U1, a specific capacitor C3, a third switch unit such as transistor Q3, comparator X1, comparator X2, comparator X3, OR gate U2, AND gate U4, resistor R1, resistor R2, a SR flip-flop U5, buffer U3, a specific voltage source providing voltage V1, and a voltage-to-current amplifier G2. An input terminal of OR gate U2 is coupled to the node SYN through the pulse generator U1 and the other input terminal is coupled to the output terminal of comparator X1. The output terminal of OR gate U2 is coupled to the setting terminal "S" of the SR flip-flop U5. The capacitor C3 is coupled to the node VS and the ground terminal. The gate of the transistor Q3 is connected to the output of the pulse generator U1, and its two other terminals are respectively connected to the node VS and the node VSS. The positive input terminal of the comparator X1 is connected to the node VSS and its negative input terminal thereof is connected to the node VS, and its output terminal thereof is coupled to an input terminal of the OR gate U2. The voltage-to-current amplifier G2 has a first input terminal, a second input terminal, a first output terminal and a second output terminal. The first input terminal is coupled to a terminal of the specific voltage source, the second input terminal is connected to node Vp to be coupled to a peak voltage signal corresponding to the induced voltage or energy of the first primary winding L1A. The first output terminal is coupled between a resistor R1 and a resistor R2, and the second output terminal is coupled to the node VSS. The resistor R1 is coupled between the first output terminal of the voltage-to-current amplifier G2 and the node VSS (equivalently connected to the first node N1 shown in FIG. 2). The resistor R2 is coupled between the first input terminal of the voltage-to-current amplifier G2 and the first output terminal of the voltage-to-current amplifier G2. The comparator X2 has a second positive input terminal, a second negative input terminal and an output terminal. The second positive input terminal is coupled to the first negative input terminal of the comparator X1, the second negative input terminal is coupled to the first output terminal of the voltage-to-current amplifier G2. The comparator X3 has a third positive input terminal, a third negative input terminal and an output terminal. The third positive input terminal is coupled to a voltage signal corresponding to the energy of the first primary side and the third negative input terminal is coupled to the first output terminal of the voltage-to-current amplifier G2. The AND gate U4 has two input terminals and an output terminal. The two input terminals are respectively coupled to the output terminal of the comparator X2 and the output terminal of the comparator X3. The setting terminal "S" of the SR flip-flop U5 is coupled to the output terminal of the OR gate U2, the reset terminal "R" of the SR flip-flop U5 is coupled to the output terminal of the AND gate U4, and the inverted output terminal "QN" of the SR flip-flop U5 is coupled to the node VOUT through the buffer U3. The SR flip-flop U5 generates the second control signal DR according to the voltage at the output terminal of the OR gate U2 and the voltage at the output terminal of the AND gate U4 and is arranged to output the second control signal DR to the processing unit 125 from the node VOUT to control the transistor Q2 of the second switch unit in the processing unit 125.

Figure 4:
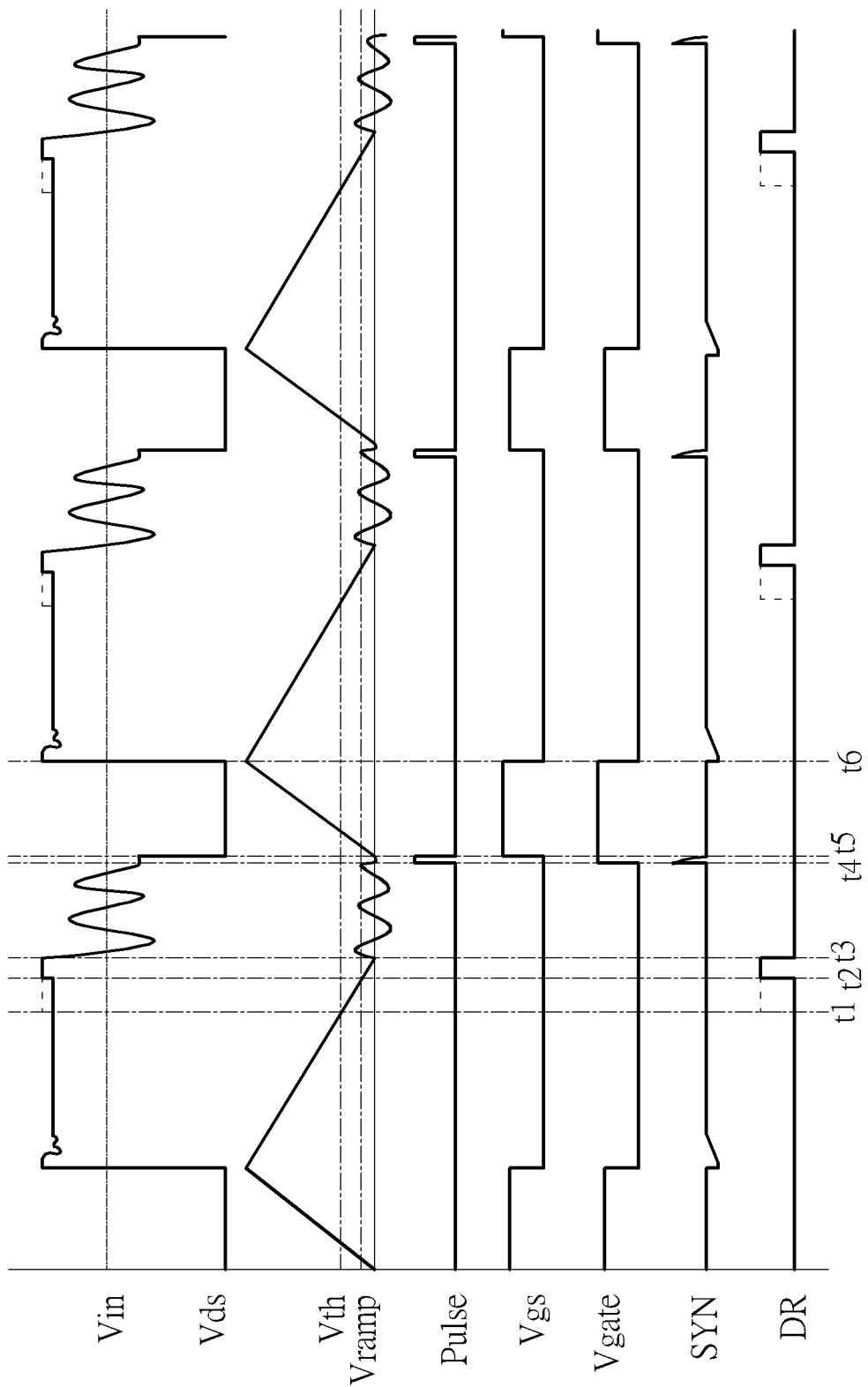
FIG. 4 is a signal waveform diagram of the power converter shown in FIG. 2 when operating under a light load condition.

FIG. 4 is a signal waveform diagram of the power converter 100 shown in FIG. 2 when operating under a light load condition. As shown in FIG. 4, the signal Vgate represents a pulse width modulation signal generated by the PWM controller 121 of the first control unit 120, and the signal Vgs signal represents the gate-source voltage signal of the transistor Q1 when the pulse width modulation signal is applied to the transistor Q1 of the first switch unit through the delay unit 115. The signal Pulse represents the signal delay width generated by the delay unit 115 (for example, the time delay between time point t4 and time point t5). The transistor Q1 is turned off when the voltage level of the signal Vgs is a low level such as zero volts, and the transistor Q1 is turned on when the voltage level of the signal Vgs is a high level. The signal Vds represents the drain-source voltage signal of the transistor Q1 of the first switch unit. When the transistor Q1 is turned on, the voltage of the signal Vds decreases to the a-drain-source voltage drop. When the transistor Q1 is turned off, the voltage of the signal Vds will be greatly changed due to the energy change induced by the coil of the first transformer TX1 and may be higher than the level of the input voltage Vin. The PWM controller 121 of the first control unit 120 for example has the voltage valley detection capability, and can determine whether the voltage of the signal Vds is lower than the input voltage Vin and is near to a voltage valley or not by detecting a feedback voltage signal VFB transmitted through the feedback unit 135 from the converted voltage VOUT. For example, as shown in FIG. 4, when the PWM controller 121 determines that the voltage of the signal Vds at the time point t4 (but not limited) is lower than the input voltage Vin and is also near to the third voltage valley, the PWM controller 121 can raise the signal Vgate from the low level to the high level, i.e. to generate a rising edge.

In addition, the signal Vramp represents the voltage drop across the capacitor C3 shown in FIG. 3. For example, initially the voltage drop is equal to zero volts. When the rising edge of the signal Vgate occurs, i.e. the level is changed and pulled from the low level to the high level, a synchronization signal having a short pulse width (e.g. the voltage signal at the node SYN of the partial pulse generating circuit 132 from time point t4 to time point t5 shown in FIG. 4) is induced and generated by using the synchronization circuit 131 (composed of second transformer TX2, capacitor C5, resistor R11, and diode D4) shown in FIG. 2. The pulse generator U1 then generates a pulse signal having a short pulse width according to the synchronization signal so that the transistor Q3 of FIG. 3 is transitorily turned on and then immediately turn off to make the voltage level at the node VS is quickly reset to the equivalent zero volts. That is, the voltage drop across the capacitor C3 shown in FIG. 3 is reset to zero volts. Then, after the transistor Q3 in FIG. 3 is turned off, since the node VS is connected to the input voltage Vin through the resistor R6 of FIG. 2, the capacitor C3 in FIG. 3 is charged by the input voltage Vin through the node VS so that the voltage level of the signal Vramp is increased with a specific slope. Then, when the falling edge of the signal Vgate occurs, i.e. when the transistor Q1 of the first switch unit 110 shown in FIG. 2 is turned off, the capacitor C3 begins to discharge electricity. Therefore, the voltage level of the signal Vramp is decreased with another specific slope. Using the comparator X1 to compare the voltage level of signal Vramp with the equivalent zero volts (i.e. the voltage at node VSS) can detect and know the exact time point that the voltage level of signal Vramp becomes zero volts. When the voltage level of signal Vramp becomes zero volts, the partial pulse generating circuit 132 of the second control unit 130 is arranged to pull the voltage level of the generated second control signal DR at the node VOUT to the low level (that is, generating a falling edge) to turn off the transistor Q2 of the second switch unit of the processing unit 125. This can simultaneously quickly lower the voltage level of the signal Vds. In other words, the time point for turning off the transistor Q2 (which is used to release the stored induced power) in the processing unit 125 is determined by charging and discharging the capacitor C3 shown in FIG. 3 according to the volt-second balance principle. In addition, the second control signal DR is a pulse signal which has a pulse width that is determined by the partial pulse generating circuit 132 of the second control unit 130 according to the amount (e.g. its peak voltage signal) of energy fed back and induced by the first primary winding L1A of the first transformer TX1. For example, the energy fed back and induced by the first primary winding L1A of the first transformer TX1 will be passed to the node Vp of the second control unit through the diode D3, resistor R7, and resistor R8 shown in FIG. 2. Then, a voltage Vth at the negative input terminal of the second comparator X2 (i.e. the voltage level Vth shown by dotted line in FIG. 4) is generated through the voltage-to-current amplifier G2, the voltage level V1 provided by the specific voltage source, resistor R1, and resistor R2. The level of voltage Vth varies with the energy fed back and induced by the first primary winding L1A of the first transformer TX1, the voltage level V1, and the design of resistor R1 and resistor R2. Using the second comparator X2 to compare the voltage Vth with the voltage level of signal Vramp can determine when a rising edge of the second control signal DR is generated. When operating under a light load condition, the energy fed back and induced by the first primary winding L1A of the first transformer TX1 is less, the rising edge of the second control signal DR for example occurs at the time point t2 shown in FIG. 4. When operating a heavy load condition, the energy fed back and induced by the first primary winding L1A of the first transformer TX1 becomes large, and the rising edge of the second control signal DR occurs for example at the time point t1 shown in FIG. 4. Accordingly, the partial pulse generating circuit 132 of the second control unit 130 can dynamically adjust the length of the turn-on period of the second switch unit in the processing unit 125 according to the energy fed back and induced by the first primary winding L1A of the first transformer TX1. In addition, the node Mask is connected to the first primary winding L1A of the first transformer TX1 through the resistor R5 in FIG. 2. The node Mask is used to avoid generating the rising edge of the second control signal DR when the energy fed back and induced by the first primary winding L1A of the first transformer TX1 corresponds to a negative cycle of the voltage.

That is, for example, the flyback converter 100 is under the light load condition and operates in the discontinuous conduction mode, when the transistor Q1 of the first switch unit shown in FIG. 2 is turned off, the energy stored by the leakage inductance of the internal coil of the transformer TX1 is released into and then stored by the clamping capacitor C1 through the clamping diode D1 to thereby eliminate or reduce the voltage spike generated by the energy of leakage inductance, and the Zener diode ZD1 is used to isolate the clamping switch Q2 from the above elements. After the energy of the leakage inductance has been released completely and the current of transformer TX1 approaches to zero, the partial pulse generating circuit 132 is arranged to correspondingly generate a pulse signal having different pulse widths to drive the clamping switch Q2 according to the different levels (higher or lower) of the peak voltage at the node Vp, so as to conduct the clamping switch Q2 to push the energy of leakage inductance back to the transformer TX1 and transmit the energy of leakage inductance to the output terminal at the secondary side. Then, the partial pulse generating circuit 132 is arranged to turn off the clamping switch Q2 when the energy or electricity which is discharged based on the volt-second balance principle becomes zero. Afterwards, when PWM controller 121 detects the occurrence of a valley voltage (a minimum value of the voltage), the PWM controller 121 is arranged to turn on and conduct the main switch, i.e. transistor Q1, in FIG. 2 to achieve the effect of valley voltage switching. Since the turn-on period of the clamping switch Q2 is relatively short, the lost energy becomes relatively less, and the conversion efficiency of the power converter 100 is significantly improved.

Figure 5:
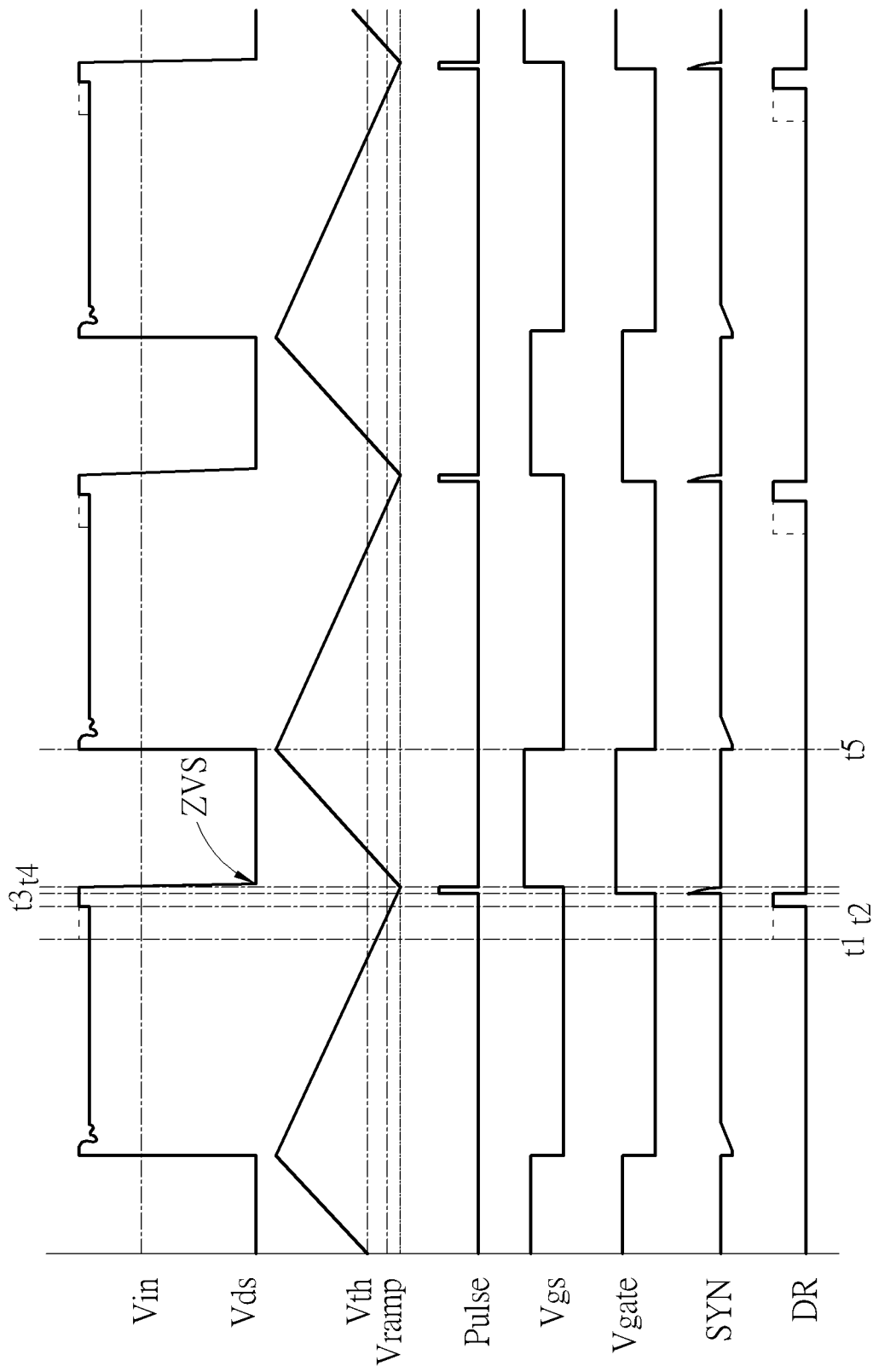
FIG. 5 is a signal waveform diagram of the power converter shown in FIG. 2 operating under a heavy load condition.

FIG. 5 is a signal waveform diagram of the power converter 100 shown in FIG. 2 operating under a heavy load condition. As shown in FIG. 5, zero voltage switching (ZVS) can be achieved. The operation is similar to FIG. 4, and the difference is that when the power converter 100 operates under the heavy load condition and when the transistor Q1 of the first switch unit in FIG. 2 based on the volt-second balance principle is about to be turned on, in one situation the capacitor C3 in FIG. 3 may not yet be discharged to the equivalent zero volts. In this situation, the synchronization signal induced at the node SYN in response to the rising edge of the signal Vgate (at time point t3) is passed to the pulse generator U1 in FIG. 3 which is used to generate the pulse signal to directly turn on and conduct the transistor Q3 of FIG. 3 so as to immediately make and force the voltage across capacitor C3 be discharged to equivalent zero volts, so that the second control unit 130 immediately pulls the second control signal DR from the high level down to the low level (that is, a falling edge occurs) to immediately turn off the transistor Q2 of the second switch unit in the processing unit 125. Then, at time point t4, the voltage of signal Vgs is pulled from the low level up to the high level to turn on the transistor Q1 of the first switch unit in FIG. 2 to achieve zero voltage switching. That is, for an example scenario of the flyback converter 100 being under the heavy load condition and operating in the continuous conduction mode, when the transistor Q1 of the first switch unit shown in FIG. 2 is turned off, the energy stored by the leakage inductance of the internal coil of the transformer TX1 is passed to and then stored by the clamping capacitor C1 through the clamping diode D1 in FIG. 2 to thereby eliminate or reduce the voltage spike caused by the leakage inductance energy, and the Zener diode ZD1 is used to isolate the clamping switch Q2 from the above elements. After the energy of the leakage inductance has been released completely, the partial pulse generating circuit 132 is arranged to correspondingly generate a pulse signal having different pulse widths to drive the clamping switch Q2 according to the different levels (higher or lower) of the peak voltage at the node Vp, so as to conduct the clamping switch Q2 to push the energy of leakage inductance back to the transformer TX1 and transmit the energy of leakage inductance to the output terminal at the secondary side as well as achieve the effect of zero volts switching. Since the turn-on period of the clamping switch Q2 is relatively short, the lost energy becomes relatively less, and the conversion efficiency of the power converter 100 is significantly improved.

Figure 6:
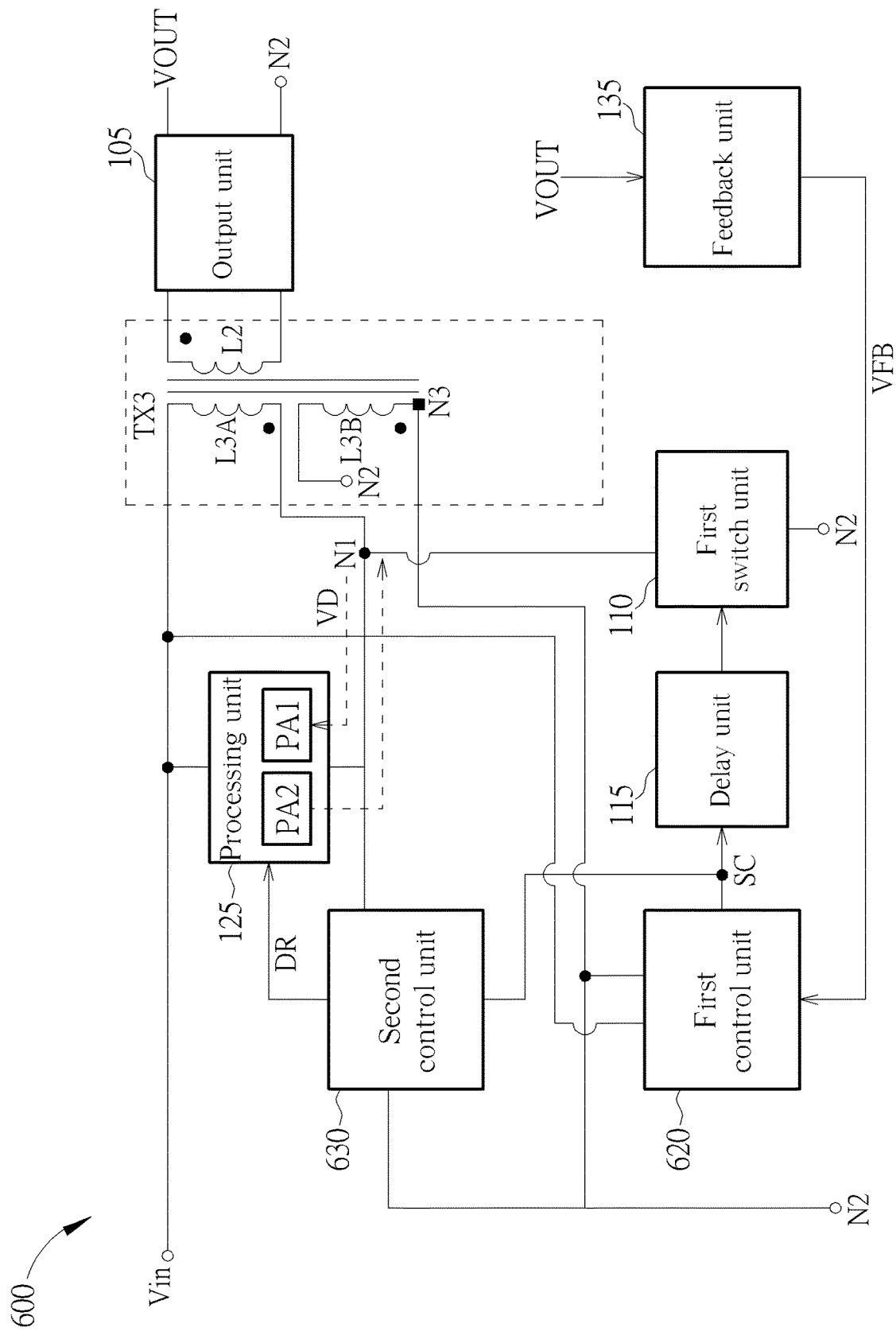
FIG. 6 is a functional block diagram of another generalized power converter according to another embodiment of the present invention.

Furthermore, please refer to FIG. 6, which is a functional block diagram of another generalized power converter 600 according to an embodiment of the present invention. The power converter 600 includes the output unit 105, a transformer TX3, first switch unit 110, delay unit 115, a first control unit 620, processing unit 125, a second control unit 630 and the feedback unit 135. The transformer TX3 includes the first primary winding L3A, second primary winding L3B and secondary winding L2. The first primary winding L3A is coupled between the input voltage Vin and the first node N1, a terminal of the second primary winding L3B is coupled to the second node N2 such as the ground level (but not limited), and the secondary winding L2 is coupled to the output unit 105; the polarities of coils of the three winding are shown in FIG. 6. The function, operation and circuit structure of the first switch unit 110 shown in FIG. 6 are the same as those of the first switch unit 110 shown in FIG. 1 and are not be repeated for brevity.

The delay unit 115 is coupled to the control terminal of the first switch unit 110, and is used to delay the first control signal SC generated by the first control unit 620 and transmitted to the control terminal of the first switch unit 110, so that the start time of turning on the first switch unit 110 can be later than the end time of the operation of the processing unit 125 to releases the induced power for at least one delay time. Therefore, the turn-on period of the first switch unit 110 can be separated from the period used by the processing unit 125 to release the induced power.

The first control unit 620 is coupled to input voltage Vin, second control unit 130, feedback unit 135, second primary winding L3B, the first switch unit 110 (through the delay unit 115), and coupled to the converted voltage VOUT (through the feedback unit 135). The first control unit 620 generates the first control signal SC according to the converted voltage VOUT (or the feedback voltage VFB corresponding to the converted voltage VOUT) to control ON/OFF of the first switch unit 110 through the delay unit 115. The second control unit 630 is coupled to the first control unit 620, the processing unit 125, and the primary winding (L3A and L3B).

The second control unit 630 generates the second control signal DR to a second switch unit (located on the second path PA2) of the processing unit 125 according to the induced power of the second primary winding L3B to control ON/OFF of the second switch unit of the processing unit 125 to control the length of the period for releasing the stored induced power and corresponding time points. It should be noted that the second control unit 630 is coupled to the input voltage Vin through the first control unit 620, and is not directly connected to the input voltage Vin. The second control unit 630 also uses the volt-second balance principle to convert the AC voltage of the transformer into a current to charge or discharge a specific capacitor to generate a triangle wave signal, and uses a pair of comparators to respectively compare the voltage of the triangle wave signal with the voltage induced by the second primary winding L3B and to compare the voltage of the triangular wave signal with an equivalent zero volts so as to respectively determine a start time and an end time of the operation for releasing the stored induced power, i.e. determining the turn-on period of the second switch unit (located on the second path PA2) in the processing unit 125. This can make the turn-on period of the second switch unit on the second path PA2 in the processing unit 125 be shorter, less lost energy, and effectively improve the conversion efficiency.

Figure 7:
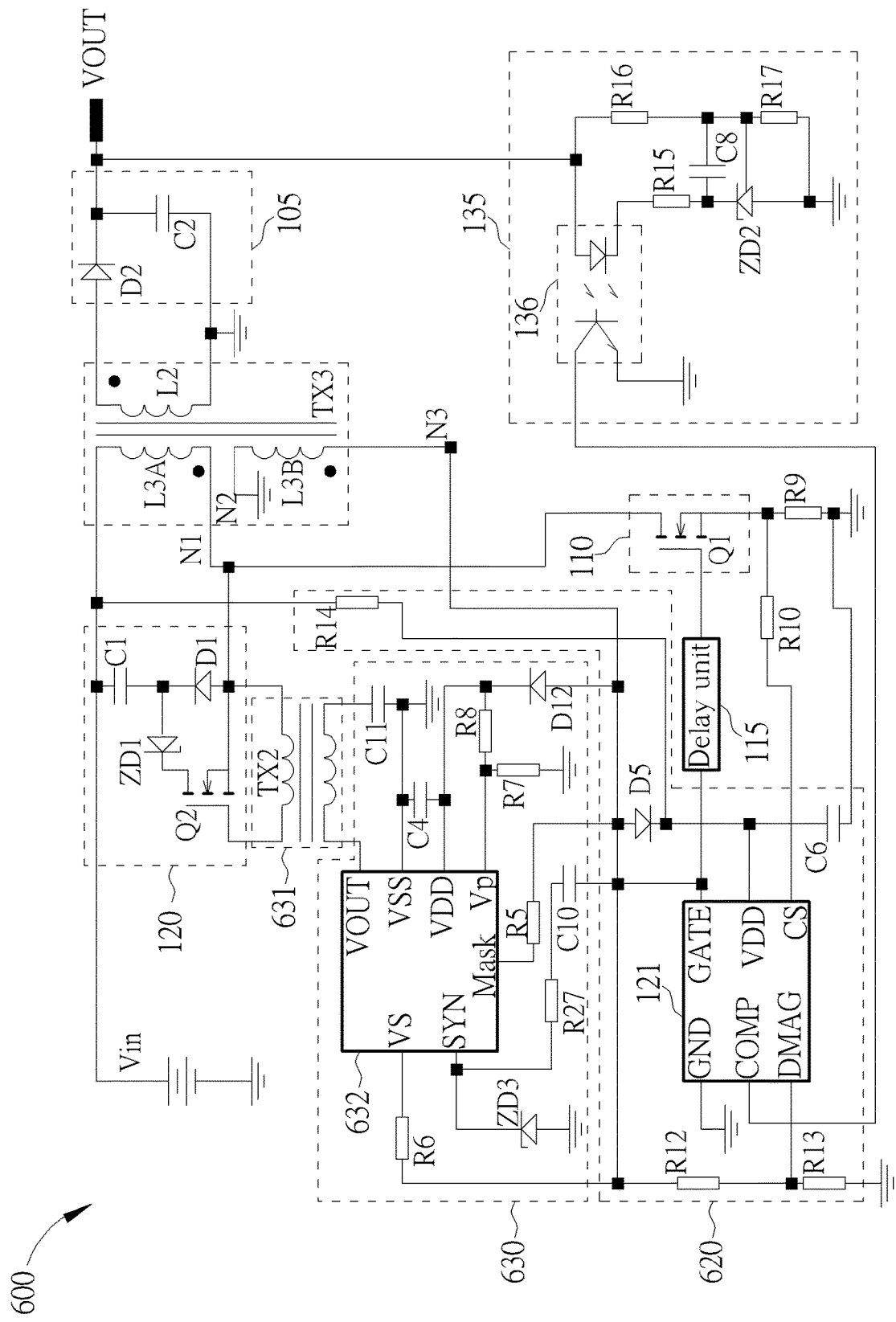
FIG. 7 is a schematic diagram of an implementation example of the power converter shown in FIG. 6.

Please refer to FIG. 7. FIG. 7 is a schematic diagram of an implementation example of the power converter 600 shown in FIG. 6. As shown in FIG. 7, the output unit 105 includes the diode D2 and the capacitor C2. The second node N2 is a ground level such as equivalent zero volts. The feedback unit 135 includes the resistor R15, resistor R16, resistor R17, capacitor C8, Zener diode ZD2 and the photo-coupler unit 136. The processing unit 125 includes the capacitor C1, diode D1, Zener diode ZD1 and the second switch unit such as transistor Q2. The first switch unit 110 includes the transistor Q1. The control terminal of the transistor Q1, e.g. its gate, is connected to the delay unit 115, and its source is connected to the second node N2 through the resistor R9, e.g. a ground level; its drain is connected to the first node N1. The first control unit 120 includes the resistor R12, resistor R13, resistor R14, PWM controller 121, diode D5, and the capacitor C6. The PWM controller 121 for example has nodes GND, COMP, DMAG, GATE, VDD, and CS, etc. The node GND is coupled to the ground level. The node COMP is coupled to the photo-coupler unit 136 of the feedback unit 135. The node DMAG is coupled between the resistor R12 and the resistor R13, and another terminal of the resistor R12 is coupled to the capacitor C10, anode of diode D5, anode of diode D12, and another terminal N3 of the second primary winding L3B. The resistor R10 is coupled between the node CS and a terminal of resistor R9. The node VDD is coupled to the capacitor C6 and the cathode of the diode D5. The cathode of the diode D5 is coupled to the input voltage Vin through the resistor R14. The node GATE is coupled to the delay unit 115 and the capacitor C10, and is arranged to generate the first control signal SC to the delay unit 115.

The second control unit 630 comprises a synchronization circuit 631 (consisting of second transformer TX2), resistor R5, resistor R6, resistor R7, resistor R8, resistor R27, Zener diode ZD3, diode D12, capacitor C4, capacitor C10, capacitor C11 and a partial pulse generating circuit 632. The partial pulse generating circuit 632 has nodes VS, VSS, SYN, Mask, VDD, Vp, and VOUT wherein the implementations of the nodes are for example ports or pins (but not limited). That is, the partial pulse generating circuit 632 may be a single integrated circuit; alternatively, the partial pulse generating circuit 632 may be integrated with other components in the second control unit 630 to form a single integrated circuit to form a control circuit; alternatively, the partial pulse generating circuit 632 may be integrated with other components outside the second control unit 630 such as processing unit 125, delay unit 115 and/or one or more components of first control unit 620 to form a single integrated circuit to form a control circuit. The second control signal DR is generated from the node VOUT to the synchronization circuit 631 to generate the same control signal DR on the other side of the second transformer TX2 to the transistor Q2 of the second switch unit of the processing unit 125 for controlling the transistor Q2. The node VS is coupled to the terminal N3 of the second primary winding L3B through the resistor R6. The node SYN is coupled to the Zener diode ZD3 (optional) and is coupled to the pin GATE of the PWM controller 121 through the resistor R27 and the capacitor C10 (that is, the node SYN is coupled to the first control signal SC). The node Mask is coupled to the anode of the diode D5 through the resistor R5. The node Vp is coupled to the ground level through the resistor R7 and coupled to the cathode of the diode D12 through the resistor R8. The node VDD is coupled to the cathode of the diode D12. The node VSS is coupled to the ground level. In practice, the implementation schematic diagram of the partial pulse generating circuit 632 can be seen in FIG. 8.

Figure 8:
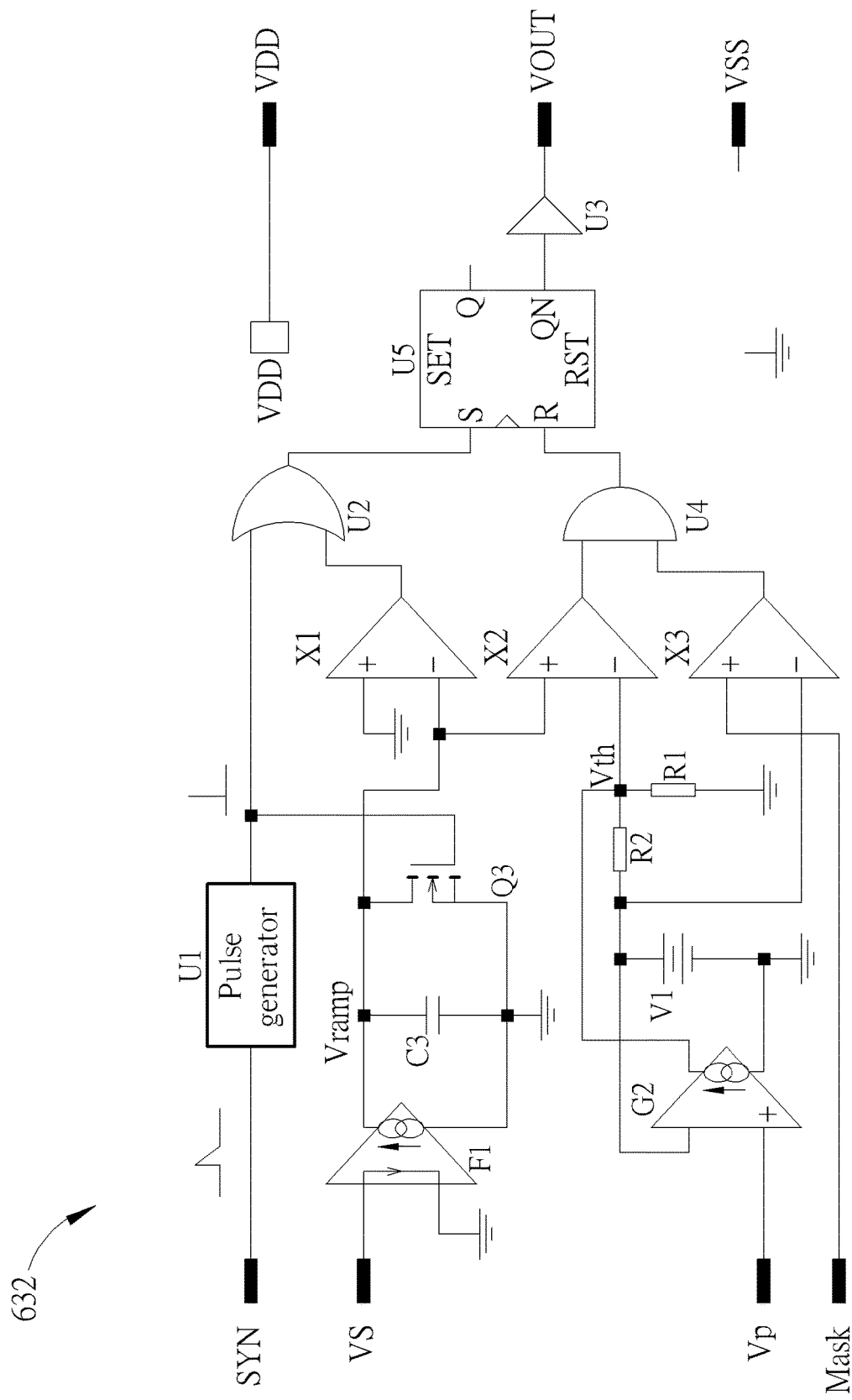
FIG. 8 is a schematic diagram of an embodiment of the partial pulse generating circuit shown in FIG. 7.

FIG. 8 is a schematic diagram of an embodiment of the partial pulse generating circuit 632 shown in FIG. 7. As shown in FIG. 8, the partial pulse generating circuit 632 includes the voltage-to-current amplifier F1, pulse generator U1, specific capacitor C3, third switch unit such as transistor Q3, comparator X1, comparator X2, comparator X3, OR gate U2, AND gate U4, resistor R1, resistor R2, SR flip-flop U5, buffer U3, a specific voltage source providing voltage V1 and the voltage-to-current amplifier G2. In addition to the voltage-to-current amplifier F1, the functions and operations of the components in the partial pulse generating circuit 632 are similar to the functions and operations of the components in the partial pulse generating circuit 132. The signal waveforms of the operation of the partial pulse generating circuit 632 are similar to the signal waveforms of FIG. 4 and FIG. 5. The description of signal waveforms is not detailed for brevity. The voltage-to-current amplifier F1 for example is used to convert the voltage at the node VS into a current to charge the capacitor C3, and the capacitor C3 can be discharged through the voltage-to-current amplifier F1. In practice, the voltage-to-current amplifier F1 is used to reduce the error when charging the capacitor C3. In other embodiments, the capacitor C3 can be charged without using the voltage-to-current amplifier F1; that is, the voltage-to-current amplifier F1 is optional.

In summary, the power converter technical solution disclosed in the present invention can overcome the limitation and problem that the conventional power converter circuit is merely designed in the application range of the low-power power supply circuit. The operations of power converter of the invention comprise the continuous conduction mode and the discontinuous conduction mode. The power converter operating under a light load condition can suppress the voltage spike, achieve the recovery of leakage inductance energy, and performs the valley voltage switching. The power converter operating under a heavy load condition can also suppress the voltage spike, achieve the recovery of leakage inductance energy, and performs zero voltage switching, so as to significantly improve the conversion efficiency of power converter such as a flyback converter.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A power converter, comprising:
an output unit, for outputting a converted voltage;
a first transformer comprising:
a first primary winding, coupled to an input voltage and a first node;
a second primary winding, coupled to a second node; and
a secondary winding, coupled to the output unit and the second node;
a first switch unit, coupled between the first primary winding and the second node, for controlling magnetic flux direction of the first primary winding;
a delay unit, coupled to a control node of the first switch unit;
a first control unit, coupled to the converted voltage and coupled to the first switch unit via the delay unit, for generating a first control signal according to the converted voltage to control ON/OFF of the first switch unit via the delay unit;
a processing unit, coupled between the input voltage and the first node, the processing unit being used for receiving a first induced voltage of the first node and storing induced power of the first induced voltage through a first path and isolating the first induced voltage from feeding in through a second path different from the first path simultaneously when the first switch unit is in an OFF state, and used for releasing the stored induced power through the second path; and
a second control unit, coupled to the input voltage, the first control unit, the processing unit, and the first primary winding, for generating a second control signal according to the input voltage and induced power of the first primary winding, to control ON/OFF of a second switch unit of the processing circuit so as to control receiving or releasing the stored induced power;
wherein the second control unit generates the second control signal according to the induced power of the first primary winding to control a turn-on period of the second switch unit of the processing unit to determine a length of a period used for releasing the stored induced power; and, the second control signal has a pulse, a width of the pulse corresponds to the turn-on period of the second switch unit the second control unit controls a specific capacitor to be charged or discharged via the induced power of the first primary winding to generate a specific voltage signal and compares the specific voltage signal with a voltage of the first node to determine a falling edge of the pulse to control an end time of the turn-on period of the second switch unit.

2. The power converter of claim 1, wherein the second control unit determines a rising edge of the pulse by comparing a peak voltage signal corresponding to the induced power of the first primary winding with the specific voltage signal, to control a start time of the turn-on period of the second switch unit.

3. The power converter of claim 1, further comprising:
a second transformer, configured and placed between the first control unit and the second control unit, for isolating the first control unit and the second control unit, the second transformer being used to generate a synchronization signal to the second control unit according to the first control signal generated by the first control unit.

4. The power converter of claim 1, wherein the second control unit comprises:
a partial pulse generating circuit, comprising:
a pulse generator, for generating a pulse signal according to a synchronization signal corresponding to the first control signal generated by the first control unit;

a specific capacitor, having a first terminal coupled to the input voltage and having a second terminal coupled to the first node, for being charged or discharged according to the input voltage;

a third switch unit, coupled between the first terminal of the specific capacitor and the first node, being controlled by the pulse signal, the third switch unit being used to reset a voltage drop across the specific capacitor when the third switch unit is turned on;

a first comparator, having an output terminal, a first positive input terminal coupled to the first node, and a first negative input terminal coupled to the first terminal of the specific capacitor; and an OR gate, having an output terminal and having two input terminals respectively coupled to the pulse signal and the output terminal of the first comparator;

wherein the first comparator is arranged to compare a voltage level at the first terminal of the specific capacitor with a voltage level at the first node to determine an end time of a turn-on period of the second switch unit.

5. The power converter of claim 4, wherein the partial pulse generating circuit further comprises:

a specific voltage source, for providing a specific voltage level;

a voltage-to-current amplifier, having a first output terminal and a second output terminal, the second output terminal being coupled to the second node, and the voltage-to-current amplifier having a first input terminal coupled to an end of the specific voltage source and having a second input terminal coupled to a peak voltage signal corresponding to the induced power of the primary winding;

a first resistor, coupled between the first output terminal of the voltage-to-current amplifier and the first node;

a second resistor, coupled between the first input terminal of the voltage-to-current amplifier and the first output terminal of the voltage-to-current amplifier;

a second comparator, having an output terminal, a second positive input terminal coupled the first negative input terminal of the first comparator, and a second negative input terminal coupled to the first output terminal of the voltage-to-current amplifier;

a third comparator, having an output terminal, a third positive input terminal coupled to a voltage signal corresponding to the induced power of the first primary winding, and a third negative input terminal coupled to the first output terminal of the voltage-to-current amplifier;

an AND gate, having an output terminal and two input terminals, the two input terminal being respectively coupled to the output terminal of the second comparator and the output terminal of the third comparator; and a flip-flop, coupled to the output terminal of the OR gate and the output terminal of the AND gate, for generating the second control signal according to a voltage at the output terminal of the OR gate and a voltage at the output terminal of the AND gate.

6. The power converter of claim 4, wherein the partial pulse generating circuit further comprises:

a voltage-to-current amplifier, having a first input terminal coupled to the input voltage, a second input terminal coupled to the first node, and a first output terminal and a second output terminal wherein the first output terminal and the second output terminal are respectively coupled to two terminals of the specific capacitor.

7. A power converter, comprising:

an output unit, for outputting a converted voltage;

a first transformer, comprising:

a first primary winding, coupled to an input voltage and a first node;

a second primary winding, coupled to a second node; and a secondary winding, coupled to the output unit and the second node;

a first switch unit, coupled between the first primary winding and the second node, for controlling magnetic flux direction of the first primary winding;

a delay unit, coupled to a control terminal of the first switch unit;

a first control unit, coupled to the converted voltage and coupled to the first switch unit via the delay unit, for generating a first control signal according to the converted voltage to control ON/OFF of the first switch unit through the delay unit;

a processing unit, coupled between the input voltage and the first node, the processing unit being used for receiving a first induced voltage of the first node and storing induced power of the first induced voltage through a first path and isolating the first induced voltage from feeding in through a second path different from the first path simultaneously when the first switch unit is in an OFF state, and used for releasing the stored induced power through the second path; and a second control unit, coupled to the first control unit, the processing unit, and the first primary winding, for generating a second control signal according to induced power of the second primary winding, to control ON/OFF of a second switch unit of the processing unit to control receiving or releasing the stored induced power;

wherein the second control unit generates the second control signal according to induced power of the second primary winding to control a turn-on period of the second switch unit of the processing unit to determine a length of a period used for releasing the stored induced power; and, the second control signal has a pulse, a width of the pulse corresponds to the turn-on period of the second switch unit the second control unit is arranged for charging or discharging a specific capacitor to generate a specific voltage signal by using induced power of the second primary winding and then comparing the specific voltage signal with a voltage at the second node to determine a falling edge of the pulse to control an end time of the turn-on period of the second switch unit.

8. The power converter of claim 7, wherein the second control unit is arranged for determining a rising edge of the pulse to control a start time of the turn-on period of the second switch unit by comparing a peak voltage signal corresponding to the induced power of the second primary winding with the specific voltage signal.

9. The power converter of claim 7, further comprising:

a second transformer, configured and placed between the processing unit and the second control unit, for isolating the processing unit and the second control unit, the second transformer transmitting the second control signal generated by the second control unit to the processing unit.

10. The power converter of claim 7, wherein the second control unit comprises:
a partial pulse generating circuit, comprising:
a pulse generator, for generating a pulse signal according to a synchronization signal corresponding to the first control signal generated by the first control unit;
a specific capacitor, having a first terminal coupled to induced voltage of the second primary winding and a second terminal coupled to the second node, the specific capacitor being charged or discharged according to the induced voltage of the second primary winding;
a third switch unit, coupled between the first terminal of the specific capacitor and the second node, the third switch unit being controlled by the pulse signal and being used for resetting a voltage drop across the specific capacitor when the third switch unit is turned on;
a first comparator, having an output terminal, a first positive input terminal coupled to the second node, and a first negative input terminal coupled to the first terminal of the specific capacitor; and
an OR gate, having an output terminal and two input terminals, the two input terminals being respectively coupled to the pulse signal and the output terminal of the first comparator;
wherein the first comparator is arranged for comparing a voltage level at the first terminal of the specific capacitor with a voltage level at the second node to determine an end time of a turn-on period of the second switch unit.

11. The power converter of claim 10, wherein the partial pulse generating circuit further comprises:
a specific voltage source, for providing a specific voltage level;
a voltage-to-current amplifier, having a first output terminal, a second output terminal coupled to the second node, a first input terminal coupled to a terminal of the specific voltage source, and a second input terminal coupled to a peak voltage signal of the induced voltage of the second primary winding;
a first resistor, coupled between the first output terminal of the voltage-to-current amplifier and the second node;
a second resistor, coupled between the first input terminal of the voltage-to-current amplifier and the first output terminal of the voltage-to-current amplifier;
a second comparator, having an output terminal, a second positive input terminal coupled to the first negative input terminal of the first comparator, and a second negative input terminal coupled to the first output terminal of the voltage-to-current amplifier;
a third comparator, having an output terminal, a third positive input terminal coupled to the induced voltage of the second primary winding, and a third negative input terminal coupled to the first output terminal of the voltage-to-current amplifier;
an AND gate, having an output terminal and two input terminals, the two input terminals being respectively coupled to the output terminal of the second comparator and the output terminal of the third comparator; and
a flip-flop, coupled to the output terminal of the OR gate and the output terminal of the AND gate, for generating the second control signal according to a voltage at the output terminal of the OR gate and a voltage at the output terminal of the AND gate.

12. The power converter of claim 11, wherein the partial pulse generating circuit further comprises:
a voltage-to-current amplifier, having a first input terminal coupled to the input voltage, a second input terminal coupled to the second node, and a first output terminal and a second output terminal, the first output terminal and the second output terminal are respectively coupled to two terminals of the specific capacitor.

13. A control circuit of a power converter, the power converter comprising:
an output unit, for outputting a converted voltage;
a first transformer, comprising:
a first primary winding, coupled to an input voltage and a first node;
a second primary winding, coupled to a second node; and
a secondary winding, coupled to the output unit and the second node;
a first switch unit, coupled between the first primary winding and the second node, for magnetic flux direction of the first primary winding;
a first control unit, coupled to the converted voltage and coupled to the first switch unit via a delay unit, for generating a first control signal according to the converted voltage to control ON/OFF of the first switch unit through the delay unit; and
a processing unit, coupled between the input voltage and the first node, the processing unit is arranged for receiving a first induced voltage of the first node and storing induced power of the first induced voltage through a first path and isolating the first induced voltage from feeding in through a second path different from the first path simultaneously when the first switch unit is in an OFF state, and used for releasing the stored induced power through the second path; and
the control circuit comprises:
the delay unit, coupled to a control terminal of the first switch unit, for making the first control signal control ON/OFF of the first switch unit by using a delay of the delay unit; and
a second control unit, coupled to the input voltage, the first control unit, the processing unit, and the first primary winding, for generating a second control signal according to the input voltage and induced power of the first primary winding, to control ON/OFF of a second switch unit of the processing unit to control receiving the induced power or releasing the stored induced power;
wherein the second control unit is arranged for generating the second control signal according to induced power of the first primary winding to control a turn-on period of the second switch unit of the processing unit to determine a length of a period used by the processing unit to release the stored induced power; and, the second control signal has a pulse, a width of the pulse corresponds to the turn-on period of the second switch unit the second control unit is arranged for charging or discharging a specific capacitor to generate a specific voltage signal by using the induced power of the first primary winding and then comparing the specific voltage signal with a voltage at the first node to determine a falling edge of the pulse to control an end time of the turn-on period of the second switch unit.

14. The control circuit of claim 13, wherein the second control unit is arranged for determining a rising edge of the pulse by comparing a peak voltage signal corresponding to the induced power of the first primary winding with the specific voltage signal, to control a start time of the turn-on period of the second switch unit.

15. A control circuit of a power converter, the power converter comprising:
- an output unit, for outputting a converted voltage;
- a first transformer, comprising:
  - a first primary winding, coupled to an input voltage and a first node;
  - a second primary winding, coupled to a second node; and
  - a secondary winding, coupled to the output unit and the second node;
- a first switch unit, coupled between the first primary winding and the second node, for controlling magnetic flux direction of the first primary winding; and
- a processing unit, coupled between the input voltage and the first node, the processing unit being arranged for receiving a first induced voltage of the first node and storing induced power of the first induced voltage through a first path and isolating the first induced voltage from feeding in through a second path different from the first path simultaneously when the first switch unit is in an OFF state, and used for releasing the stored induced power through the second path; and
- the control circuit comprises:
  - a delay unit, coupled to a control terminal of the first switch unit;
  - a first control unit, coupled to the converted voltage and coupled to the first switch unit via the delay unit, for generating a first control signal according to the converted voltage, to control ON/OFF of the first switch unit through the delay unit; and
  - a second control unit, coupled to the first control unit, the processing unit, and the first primary winding, for generating a second control signal according induced power of the second primary winding to control ON/OFF of a second switch unit of the processing unit to control receiving the induced power of the first induced voltage or releasing the stored induced power of the first induced voltage;

wherein the second control unit is arranged for generating the second control signal according to the induced power of the second primary winding to control a turn-on period of the second switch unit of the processing unit, to determine a length of a period used by the processing unit to releasing the stored induced power of the first induced voltage; and, the second control signal has a pulse, a width of the pulse corresponds to the turn-on period of the second switch unit the second control unit is arranged for charging or discharging a specific capacitor to generate a specific voltage signal by using the induced power of the second primary winding and then arranged for comparing the specific voltage signal with a voltage at the second node, to determine a falling edge of the pulse to control an end time of the turn-on period of the second switch unit.

16. The control circuit of claim 15, wherein the second control unit is arranged for determining a rising edge of the pulse by comparing a peak voltage signal corresponding to the induced power of the second primary winding with the specific voltage signal, to control an start time of the turn-on period of the second switch unit.

* * * * *